United States Patent
Kim et al.

(10) Patent No.: US 12,541,959 B2
(45) Date of Patent: Feb. 3, 2026

(54) ACTIVE LEARNING DEVICE AND ACTIVE LEARNING METHOD

(71) Applicants: HYUNDAI MOTOR COMPANY, Seoul (KR); KIA CORPORATION, Seoul (KR)

(72) Inventors: Jung Gee Kim, Seoul (KR); Geon Kang, Pyeongtaek-si (KR); Yu Jin Yun, Seoul (KR); Jin Sol Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 339 days.

(21) Appl. No.: 18/141,630

(22) Filed: May 1, 2023

(65) Prior Publication Data
US 2024/0177464 A1    May 30, 2024

(30) Foreign Application Priority Data
Nov. 28, 2022    (KR) ........................ 10-2022-0161849

(51) Int. Cl.
*G06V 10/00*    (2022.01)
*G06V 10/74*    (2022.01)
(Continued)

(52) U.S. Cl.
CPC .......... *G06V 10/778* (2022.01); *G06V 10/761* (2022.01); *G06V 10/771* (2022.01); *G06V 10/7715* (2022.01); *G06V 10/82* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 9,984,325 B1 *    5/2018    Kim ........................ G06V 10/82
10,095,977 B1 *   10/2018    Kim ...................... G06V 10/451
(Continued)

FOREIGN PATENT DOCUMENTS

| KR | 20210114257 A | 9/2021 |
| KR | 20220067931 A | 5/2022 |
| KR | 20220069335 A | 5/2022 |

OTHER PUBLICATIONS

CN110047101A Object posture estimation method, method for obtaining dense depth image and corresponding device; Publication CN110047101A-Jul. 23, 2019.*
(Continued)

*Primary Examiner* — Amir Alavi
(74) *Attorney, Agent, or Firm* — Lempia Summerfield Katz LLC

(57) ABSTRACT

An active learning device and an active learning method are provided. The active learning device includes an input device configured to receive an input image, and a controller configured to extract a first feature from the input image, extract a second feature from a segmentation image corresponding to the input image, and extract a third feature from a depth image corresponding to the input image. The active learning device is also configured to determine the input image as a training image based on cosine distances among the first feature, the second feature and the third feature, and labels the training image.

16 Claims, 13 Drawing Sheets

(51) Int. Cl.
*G06V 10/77* (2022.01)
*G06V 10/771* (2022.01)
*G06V 10/778* (2022.01)
*G06V 10/82* (2022.01)

(58) Field of Classification Search
CPC ...... G06N 3/088; G06N 3/092; G06N 3/0454; G06N 3/0475; G06N 3/0464; G06N 20/00; G06N 20/10; G06N 20/20; G06V 10/82; G06V 10/778; G06V 10/7715; G06V 10/10; G06V 10/771; G06V 10/761; G06V 20/70; G06V 20/56
See application file for complete search history.

(56) References Cited

U.S. PATENT DOCUMENTS

| | | | |
|---|---|---|---|
| 10,417,524 B2 * | 9/2019 | Feng | G06F 18/2155 |
| 10,748,035 B2 * | 8/2020 | Lee | G06V 10/82 |
| 11,810,312 B2 * | 11/2023 | Park | G06T 7/593 |
| 12,111,907 B2 * | 10/2024 | Strong | H04N 19/80 |
| 12,136,233 B2 * | 11/2024 | Babazaki | G06V 10/774 |
| 12,213,643 B2 * | 2/2025 | Michihata | A61B 1/043 |
| 2019/0101927 A1 | 4/2019 | Zhao et al. | |
| 2019/0205643 A1 | 7/2019 | Liu et al. | |
| 2019/0295261 A1 | 9/2019 | Kang et al. | |
| 2021/0366128 A1 | 11/2021 | Kim et al. | |
| 2024/0177464 A1 * | 5/2024 | Kim | G06V 10/7715 |

OTHER PUBLICATIONS

CN112101476A Picture classification method and device, electronic device and storage medium; Publication CN112101476A. 2020-12-18.*

* cited by examiner

ACTIVE LEARNING DEVICE AND ACTIVE LEARNING METHOD

CROSS-REFERENCE TO RELATED APPLICATION

This application claims the benefit of and priority to Korean Patent Application No. 10-2022-0161849, filed on Nov. 28, 2022, the entire contents of which are incorporated herein by reference.

TECHNICAL FIELD

The present disclosure relates to a multi-task based active learning technology.

BACKGROUND

In the field of artificial intelligence, an artificial neural network (ANN) is an algorithm that allows a machine to be trained by simulating a human neural structure. Recently, ANNs have been applied to image recognition, voice recognition, natural language processing, and the like, and have shown excellent results. The artificial neural network consists of an input layer which receives an input, a hidden layer which performs learning, and an output layer which returns a results of the operations. A deep neural network (DNN) with multiple hidden layers is a type of an artificial neural network. The deep artificial neural network may include a convolutional neural network (CNN), a recurrent neural network (RNN), or the like depending on structures, problems to be solved, and purposes.

The artificial neural network allows a computer to learn from data. When trying to solve a problem using the artificial neural network, a suitable artificial neural network model and data to be analyzed need to be prepared. The artificial neural network model to solve a problem is trained based on data. Before training the model, it is necessary to classify the data into two types. The reason for this is that input data and output data required by the artificial neural network model are regularized. Therefore, acquired raw data is typically processed to generate data suitable to be used as requested input data. The processed data needs to be divided into two types. In particular, the data needs to be classified into a training dataset and a validation dataset. The training dataset is used to train the model, and the validation dataset is used to verify the performance of the model.

There are several reasons for validating the artificial neural network model. Artificial neural network developers may perform tuning of the model by modifying hyperparameters of the model based on the verification result of the model. In addition, the artificial neural network developers may verify models to select which model is suitable among several models. The reasons why model verification is necessary are explained in more detail as follows.

The first reason is to predict accuracy. The purpose of artificial neural network is to achieve good performance on out-of-sample data that is not used for training. Therefore, after creating the model, it is necessary to check how well the model will perform on out-of-sample data. However, it is required not to validate the model using the train dataset, so that the accuracy of the model needs to be measured using the validation dataset separate from the train dataset.

The second reason is to improve the performance of the model by tuning the model. For example, overfitting may be prevented. Overfitting refers to a state where a model is overtrained on the training dataset. For example, when the training accuracy is high but the validation accuracy is low, it may be suspected that overfitting has occurred. Furthermore, occurrence of overfitting may be determined through training loss and validation loss. When overfitting occurs, it is necessary to prevent overfitting to increase the validation accuracy. Overfitting may be prevented by using methods such as regularization or dropout.

Active learning is a technique for updating the deep learning model by repeatedly performing data sampling until the performance of the deep learning model is converged, based on data having an amount of information, i.e., training data capable of improving the performance of the deep learning model. Therefore, the most desirable active learning scenario is to converge to a target value with minimal labeling based on a good sampling strategy.

At the core of such active learning is to select data with the largest amount of information among unlabeled data as training data. Selecting data (training data) that requires labeling is called a query strategy, and labeling refers to an operation of creating labels (correct answer data).

The most common query strategy is uncertainty sampling, which is a strategy in which a machine learning model samples data to be labeled based on probability values predicted for each data. Uncertainty sampling techniques may largely include a least confidence sampling strategy, a margin confidence sampling strategy, and an entropy sampling strategy.

Conventional active learning techniques have a problem in that they can only label training images capable of improving the performance of single-task models, but cannot label training images capable of improving the performance of multi-task models.

The foregoing is intended to merely enhance an understanding of the background of the present disclosure, and is not intended to mean that the statements in this section fall within the preview of an existing technology well known to those of ordinary skill in the art.

SUMMARY

The present disclosure has been made to solve the above-mentioned problems occurring in the prior art while advantages achieved by the prior art are maintained intact.

An aspect of the present disclosure provide an active learning device and an active learning method that extract a first feature from an input image, extract a second feature from a segmentation image corresponding to the input image, extract a third feature from a depth image corresponding to the input image, and determine the input image as a training image based on cosine distances among the first feature, the second feature and the third feature, and label the training image capable of improving performance of a multi-task model.

Another aspect of the present disclosure provides an active learning device and an active learning method that sum a first cosine distance between the first feature and the second feature, a second cosine distance between the first feature and the third feature, and a third cosine distance between the second feature and the third feature and determine the input image as a training image based on a result of the summing.

Still another aspect of the present disclosure provides an active learning device and an active learning method that determine whether to determine the input image as a training image based on the first cosine distance between the first feature and the second feature and the second cosine distance between the first feature and the third feature.

Still another of the present disclosure provides an active learning device and an active learning method that identify an effect of the input image on the deep learning model for each task (e.g., segmentation, depth estimation, or the like) based on the first cosine distance between the first feature and the second feature and the second cosine distance between the first feature and the third feature.

Still another aspect of the present disclosure provides an active learning device and an active learning method that perform a variety of control operations in the process of extracting a first feature from the input image, extracting a second feature from the segmentation image corresponding to the input image, extracting a third feature from the depth image corresponding to the input image, and training a deep learning model such that a first cosine distance between the first feature and the second feature and a second cosine distance between the first feature and the third feature are both shortened when a labeled input image, a segmentation image corresponding to the input image and a depth image corresponding to the input image have been provided.

The objects of the present disclosure are not limited to the above-mentioned objects, and other objects and advantages of the present disclosure which are not mentioned should be clearly understood the following description by those having ordinary skill in the art to which the present disclosure pertains. It should also be readily apparent that the objects and advantages of the disclosure may be realized by means of the instrumentalities and combinations particularly pointed out in the appended claims.

The technical problems to be solved by the present disclosure are not limited to the aforementioned problems, and other technical problems not mentioned herein should be clearly understood from the following description by those skilled in the art to which the present disclosure pertains.

According to an embodiment of the present disclosure, an active learning device includes: an input device configured to receive an input image, and a controller configured to extract a first feature from the input image, extract a second feature from a segmentation image corresponding to the input image, and extract a third feature from a depth image corresponding to the input image. The controller is also configured to determine the input image as a training image based on cosine distances among the first feature, the second feature and the third feature, and label the training image.

In an aspect, the controller may be configured to sum a first cosine distance between the first feature and the second feature, a second cosine distance between the first feature and the third feature, and a third cosine distance between the second feature and the third feature. The controller may be configured to determine the input image as the training image based on a result of the summing.

In an aspect, the controller may be configured to determine the input image as the training image capable of improving performance of a deep learning model when the result of the summing exceeds a first threshold value.

In an aspect, the third cosine distance may induce uniformity in training between tasks of a deep learning model.

In an aspect, the controller may be configured to select a specified training image corresponding to a degree of training for each task of a deep learning model.

In an aspect, the controller may be configured to determine the input image as a training image of a first task corresponding to the third feature when a first cosine distance between the first feature and a second feature does not exceed a second threshold value and a second cosine distance between the first feature and the third feature exceeds the second threshold value.

In an aspect, the controller may be configured to determine the input image as a training image of a second task corresponding to the second feature when a first cosine distance between the first feature and the second feature exceeds a second threshold value and a second cosine distance between the first feature and the third feature does not exceed the second threshold value.

In an aspect, the controller may be configured to train a deep learning model such that a first cosine distance between the first feature and a second feature and the second cosine distance between the first feature and the third feature are both shortened.

In an aspect, the input device may receive a labeled image when training a deep learning model and receive an unlabeled image when selecting a training image of the deep learning model.

According to another embodiment of the present disclosure, an active learning method includes receiving, by an input device, an input image. The active learning method also includes extracting, by a controller, a first feature from the input image, extracting, by the controller, a second feature from a segmentation image corresponding to the input image, and extracting, by the controller, a third feature from a depth image corresponding to the input image. The active learning method may further include determining, by the controller, the input image as a training image based on cosine distances among the first feature, the second feature, and the third feature, and labeling the training image.

In an aspect, determining the input image as the training image may include summing a first cosine distance between the first feature and the second feature, a second cosine distance between the first feature and the third feature, and a third cosine distance between the second feature and the third feature, and determining the input image as the training image based on a result of the summing.

In an aspect, determining the input image as the training image based on the result of the summing may include determining the input image as the training image capable of improving performance of a deep learning model when the result of the summing exceeds a first threshold value.

In an aspect, the third cosine distance may induce uniformity in training between tasks of a deep learning model.

In an aspect, determining the input image as the training image may include selecting a specified training image corresponding to a degree of training for each task of a deep learning model.

In an aspect, selecting the specified training image may include determining the input image as a training image of a first task corresponding to the third feature when a first cosine distance between the first feature and the second feature does not exceed a second threshold value and a second cosine distance between the first feature and the third feature exceeds the second threshold value.

In an aspect, selecting the specified training image may include determining the input image as a training image of a second task corresponding to the second feature when a first cosine distance between the first feature and the second feature exceeds a second threshold value and a second cosine distance between the first feature and the third feature does not exceed the second threshold value.

In an aspect, the active learning method may further include training, by the controller, a deep learning model such that a first cosine distance between the first feature and the second feature and a second cosine distance between the first feature and the third feature are both shortened.

In an aspect, receiving the input image by the input device may include receiving a labeled image when training a deep learning model and receiving an unlabeled image when selecting the training image of the deep learning model.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Hereinafter, embodiments of the present disclosure are described in detail with reference to the accompanying drawings. In the accompanying drawings, the identical or equivalent components are designated by the identical numerals even when they are displayed on different drawings. Further, in describing the embodiment of the present disclosure, where it has been considered that a specific description of well-known features or functions may obscure the gist of the present disclosure, a detailed description thereof has been omitted.

In the following description of components of embodiments of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art, and should not be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Figure 1:
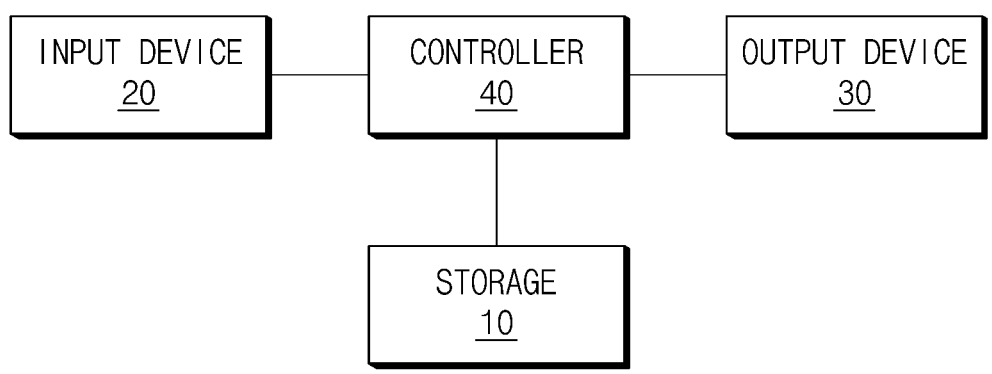
FIG. 1 is a configuration diagram of an active learning, according to an embodiment of the present disclosure.

FIG. 1 is a diagram illustrating an example configuration of an active learning device, according to an embodiment of the present disclosure.

Referring to FIG. 1, an active learning device according to an embodiment of the present disclosure may include a storage 10, an input device 20, an output device 30, and a controller 40. According to some embodiments of the present disclosure, the components may be combined with each other as one entity, or some components may be omitted.

The storage 10 may store various logics, algorithms and programs required in the process of extracting a first feature from an input image, extracting a second feature from a segmentation image corresponding to the input image, extracting a third feature from a depth image corresponding to the input image, determining the input image as a training image based on cosine distances among the first feature, the second feature and the third feature, and labeling the training image.

The storage 10 may further store various logics, algorithms and programs required in the process of summing a first cosine distance between the first feature and the second feature, a second cosine distance between the first feature and the third feature, and a third cosine distance between the second feature and the third feature and determining the input image as a training image based on a result of the summing.

The storage 10 may further store various logics, algorithms and programs required in the process of determining the input image as a training image based on the first cosine distance between the first feature and the second feature and the second cosine distance between the first feature and the third feature.

The storage 10 may further store various logics, algorithms and programs required in the process of identifying an effect of the input image on the deep learning model for each task (segmentation, depth estimation, or the like) based on the first cosine distance between the first feature and the second feature and the second cosine distance between the first feature and the third feature.

When a labeled input image, a segmentation image corresponding to the input image, and a depth image corresponding to the input image have been provided, the storage 10 may store various logics, algorithms and programs required in the process of extracting a first feature from the input image, extracting a second feature from the segmentation image corresponding to the input image, extracting a third feature from the depth image corresponding to the input image, and training a deep learning model such that a first cosine distance between the first feature and the second feature and a second cosine distance between the first feature and the third feature are both shortened.

The storage 10 may include at least one type of storage medium of memories such as a flash memory type memory, a hard disk type memory, a micro type memory, and a card type memory (e.g., an SD card (Secure Digital Card) or an XD card (eXtream Digital Card)), a RAM (Random Access Memory), an SRAM (Static RAM), a ROM (Read Only Memory), a PROM (Programmable ROM), a EEPROM (Electrically Erasable PROM), a MRAM (Magnetic RAM), and an optical disk type memory.

The input device 20 may receive a labeled input image, a segmentation image corresponding to the input image, and a depth image corresponding to the input image in the process of training the deep learning model. In an embodiment, the input image is as shown in FIG. 2A, the segmentation image corresponding to the input image is as shown in FIG. 2B, and the depth image corresponding to the input image is as shown in FIG. 2C.

Figure 2A:
FIG. 2A depicts an example input image received by an input device of an active learning device when training a deep learning model, according to an embodiment of the present disclosure.

FIG. 2A is an example of an input image received by the input device provided in an active learning device according to an embodiment of the present disclosure, in the process of training a deep learning model. The input image is a ground truth image labeled as an image for training the deep learning model.

Figure 2B:
FIG. 2B depicts an example segmentation image received by an input device of an active learning device when training a deep learning model, according to an embodiment of the present disclosure.

FIG. 2B is an example of a segmentation image received by the input device provided in the active learning device according to an embodiment of the present disclosure, in the process of training a deep learning model. The segmentation image is the result of performing semantic segmentation on the input image shown in FIG. 2A. In an embodiment, the segmentation image is a ground truth (GT) image.

Figure 2C:
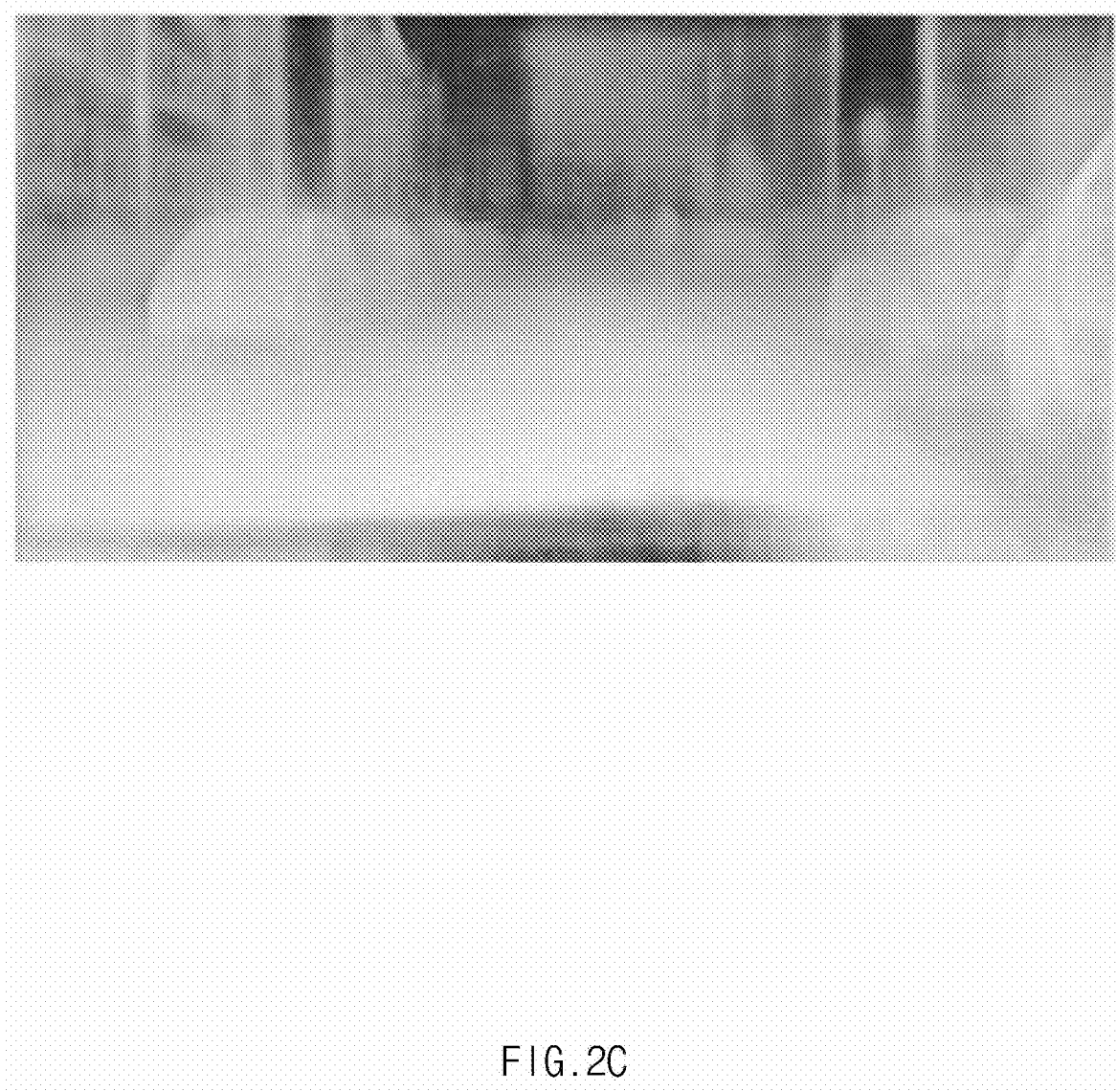
FIG. 2C depicts an example depth image received by an input device of an active learning device when training a deep learning model, according to an embodiment of the present disclosure.

FIG. 2C is an example of a depth image received by the input device provided in the active learning device according to an embodiment of the present disclosure, in the process of training a deep learning model. The depth image is the result of performing Depth Estimation on the input image shown in FIG. 2A. In an embodiment, the depth image is a ground truth (GT) image.

Figure 3A:
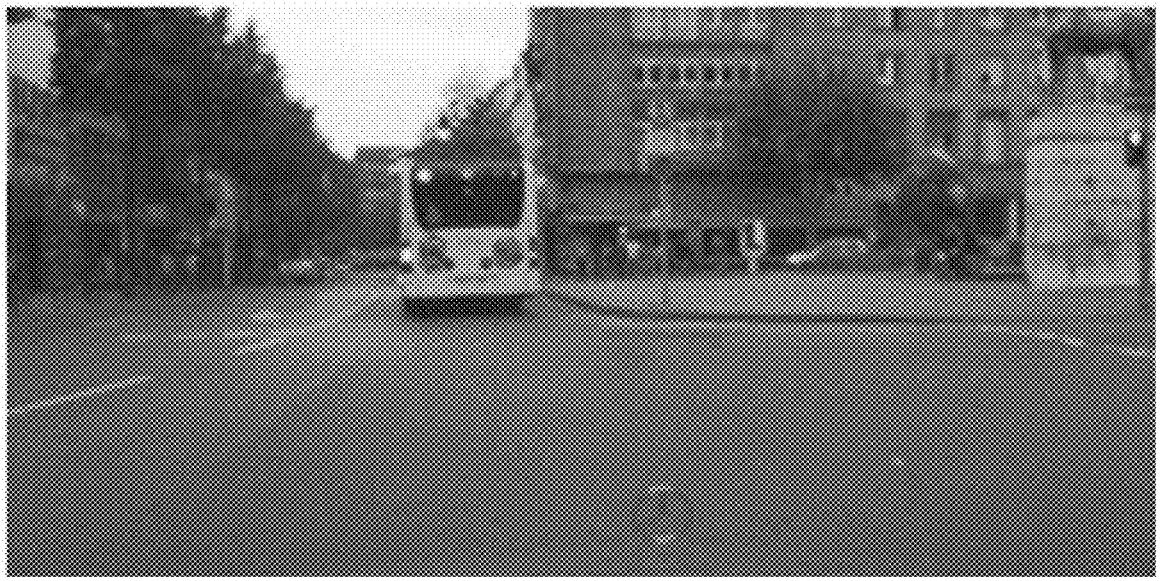
FIG. 3A depicts an example input image received by an input device of an active learning device when selecting a training image, according to an embodiment of the present disclosure.

In addition, the input device 20 may receive an input image in the process of selecting a training image based on a deep learning model. The input image may be an image that is not labeled, and an example thereof is shown in FIG. 3A.

When the input image received through the input device 20 is determined as a training image, the output device 30 may notify a user of the input image.

The controller 40 may perform overall control such that each of the above components performs its function. The controller 40 may be implemented in the form of hardware or software, or may be implemented in a combination of hardware and software. In an embodiment, the controller 40 may be implemented with a microprocessor, but is not limited thereto.

The controller 40 may perform a variety of control operations in the process of extracting a first feature from an input image, extracting a second feature from a segmentation image corresponding to the input image, extracting a third feature from a depth image corresponding to the input image, determining the input image as a training image based on cosine distances among the first feature, the second feature and the third feature, and labeling the training image.

In addition, the controller 40 may perform a variety of control operations in the process of summing a first cosine distance between the first feature and the second feature, a second cosine distance between the first feature and the third feature, and a third cosine distance between the second feature and the third feature and determining the input image as a training image based on a result of the summing.

In addition, the controller 40 may perform a variety of control operations in the process of determining the input image as a training image based on the first cosine distance between the first feature and the second feature and the second cosine distance between the first feature and the third feature.

In addition, the controller 40 may perform a variety of control operations in the process of identifying an effect of the input image on the deep learning model for each task (segmentation, depth estimation, or the like) based on the first cosine distance between the first feature and the second feature and the second cosine distance between the first feature and the third feature.

When a labeled input image, a segmentation image corresponding to the input image, and a depth image corresponding to the input image have been provided, the controller 40 may perform a variety of control operations in the process of extracting a first feature from the input image, extracting a second feature from the segmentation image corresponding to the input image, extracting a third feature from the depth image corresponding to the input image, and training a deep learning model such that a first cosine distance between the first feature and the second feature and a second cosine distance between the first feature and the third feature are both shortened.

Hereinafter, an operation of training a deep learning model in the controller 40 and an operation of determining an input image as a training image based on an inference result of the deep learning model in the controller 40, in accordance with embodiments of the present disclosure, are described in more detail with reference to FIGS. 4-6. Hereinafter, a multi-task model as an example of a deep learning model is described, but the present disclosure is not limited thereto.

For reference, multi-task learning (MTL) is a method of providing a plurality of output layers in one deep neural network and allowing the one deep neural network to simultaneously learn multiple tasks, in which correlations between the tasks are utilized in the learning process. The multiple tasks share one deep neural network to improve learning efficiency, and overfitting of hidden layers to one task is prevented to improve the generalization performance of the deep neural network.

Figure 4:
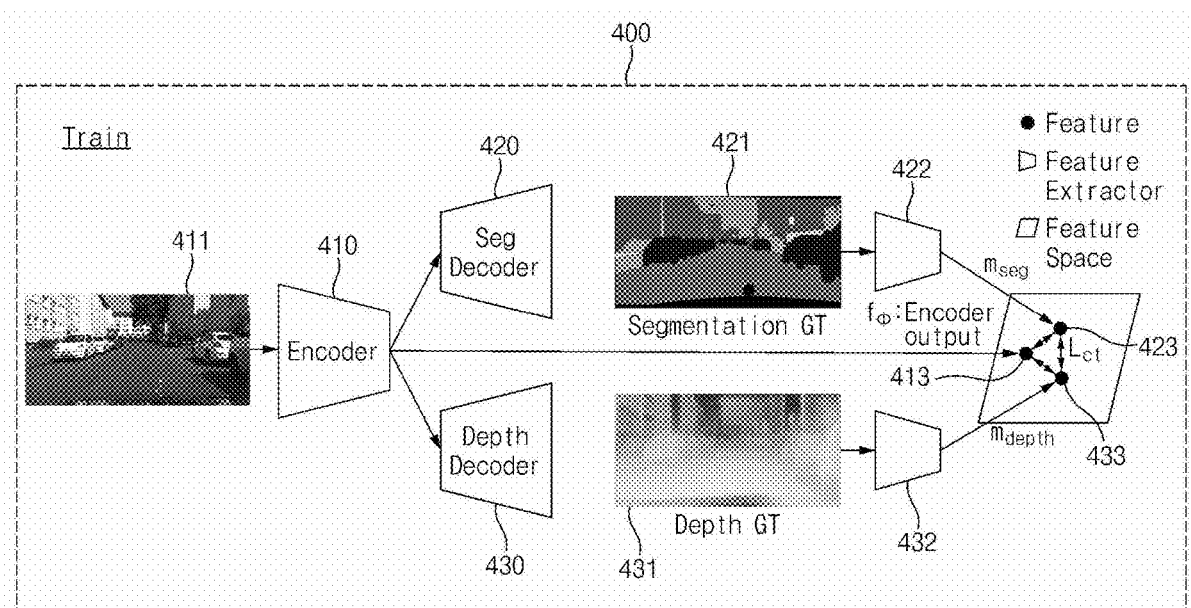
FIG. 4 is a diagram illustrating a process of training a deep learning model in a controller provided in an active learning device, according to an embodiment of the present disclosure.

FIG. 4 is a diagram illustrating a process of training a deep learning model in a controller provided in an active learning device, according to an embodiment of the present disclosure.

Referring to FIG. 4, a deep learning model 400 may include: an encoder 410, a segmentation decoder 420, a feature extractor A 422, a depth decoder 430, and a feature extractor B 432. For reference, the segmentation decoder 420 and the depth decoder 430 do not operate during the training process.

The encoder 410 may receive an input image 411 as shown in FIG. 2A from the input device 20 and may extract a first feature 413 from the input image 411. In an embodiment, the input image 411 may be a labeled image.

The feature extractor A 422 may receive a segmentation image 421 as shown in FIG. 2B from the input device 20 and may extract a second feature 423 from the segmentation image 421. an embodiment, the feature extractor A 422 may extract the same feature as the first feature 413 extracted by the encoder 410 as the second feature 423.

The feature extractor B 432 may receive a depth image 431 as shown in FIG. 2C from the input device 20 and may extract a third feature 433 from the depth image 431. In an embodiment, the feature extractor B 432 may extract the same feature as the first feature 413 extracted by the encoder 410 as the third feature 433.

The controller 40 may train the deep learning model such that a first cosine distance between the first feature 413 and the second feature 423 and a second cosine distance between the first feature 413 and the third feature 433 are shortened in a feature space.

In one embodiment of the present disclosure, each of the features may be expressed in the form of a vector. When analyzing a similarity between two feature vectors, a cosine similarity may be mainly used. The range of cosine similarity values is [−1, 1], and the similarity between two same vectors is 1. The cosine distance may be calculated by subtracting the cosine similarity from 1. Therefore, the range of possible values for the cosine distance is [0,2], and the cosine distance of the same two vectors is 0 (zero).

In addition, the controller 40 may express a total loss $L_{total}$ of the deep learning model as in [Equation 1] below.

$$L_{total}=L_{MTL}+L_{ct}\{m_{seg}(y_{seg}),m_{depth}(y_{depth})\}+L_{ct}\{m_{seg}(y_{seg}),f_\varnothing\}+L_{ct}\{m_{depth}(y_{depth}),f_\varnothing\} \quad \text{Equation 1}$$

In Equation 1, $L_{MTL}$ denotes the loss of multi-task learning, $L_{ct}$ denotes the cosine distance, $f_\varnothing$ denotes the first feature extracted by the encoder, $m_{seg}(y_{seg})$ denotes the second feature extracted by the feature extractor A, and $m_{depth}(y_{depth})$ denotes the third feature extracted by the feature extractor B.

Figure 5:
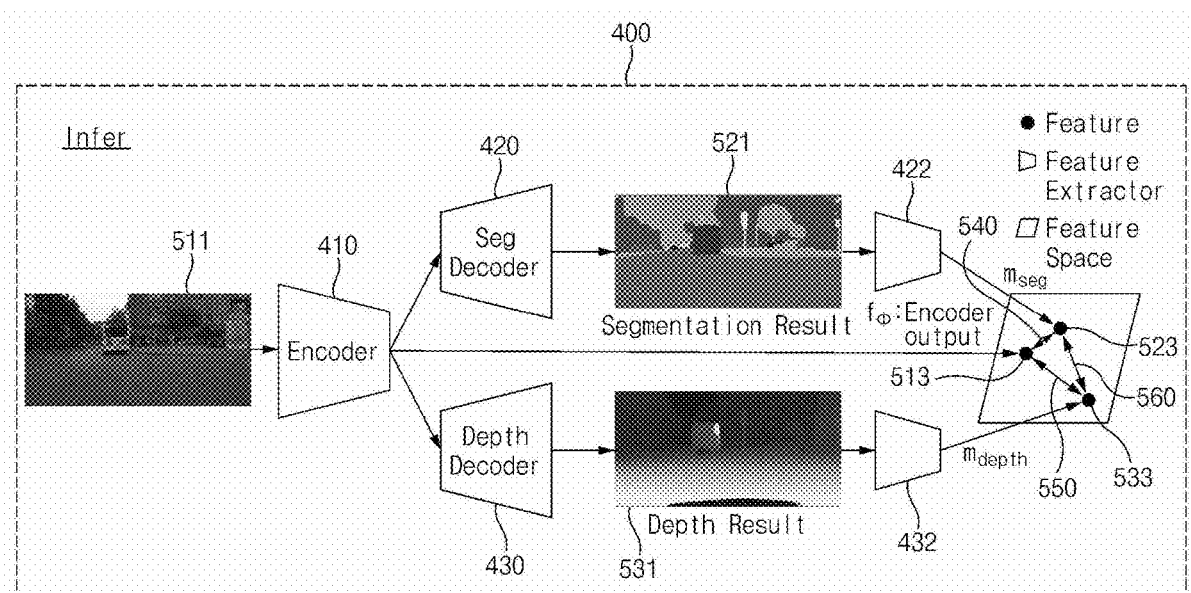
FIG. 5 is a diagram illustrating a process of selecting a training image based on a deep learning model in a controller provided in an active learning device, according to an embodiment of the present disclosure.

FIG. 5 is a diagram illustrating a process of selecting a training image based on a deep learning model in a controller provided in an active learning device, according to an embodiment of the present disclosure.

As shown in FIG. 5, the encoder 410 may receive an input image 511 as shown in FIG. 3A from the input device 20 and may extract a first feature 513 from the input image 511. In an embodiment, the input image 511 is an unlabeled image.

Figure 3B:
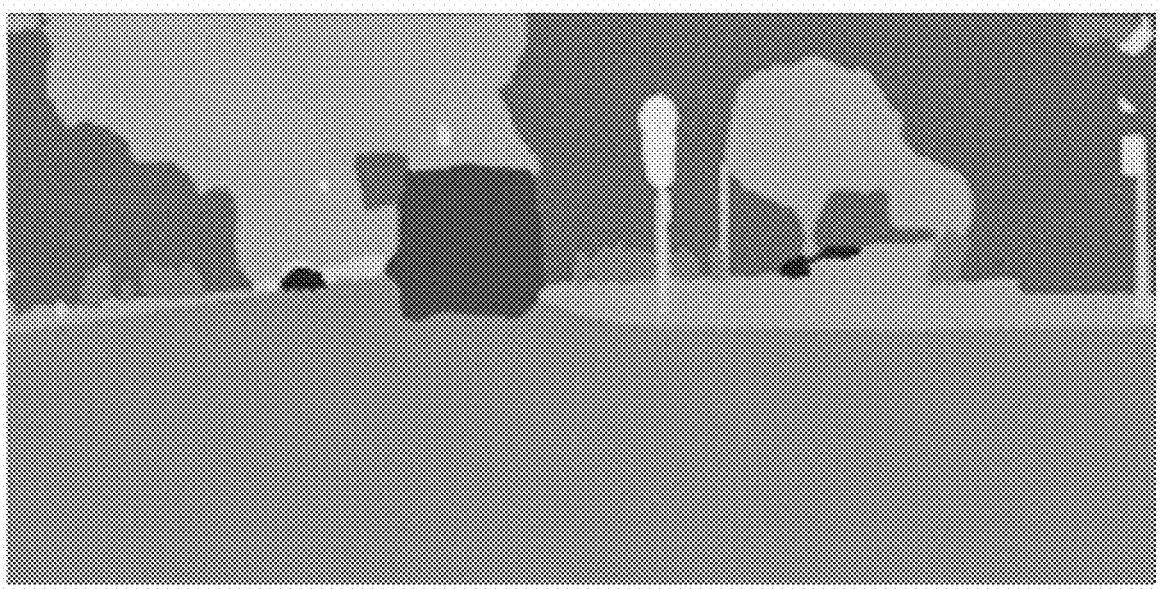
FIG. 3B depicts an example segmentation image received by an input device of an active learning device when selecting a training image, according to an embodiment of the present disclosure.

The segmentation decoder 420 may generate a segmentation image 521 as shown in FIG. 3B based on the output of the encoder 410. In an embodiment, the segmentation image 521 may represent an image in which the meaning of each region in the input image 511 is separated at pixel levels.

The feature extractor A 422 may extract a second feature 523 from the segmentation image 521 generated by the segmentation decoder 420. In an embodiment, the feature extractor A 422 may extract the same feature as the first feature 513 extracted by the encoder 410 as the second feature 523.

Figure 3C:
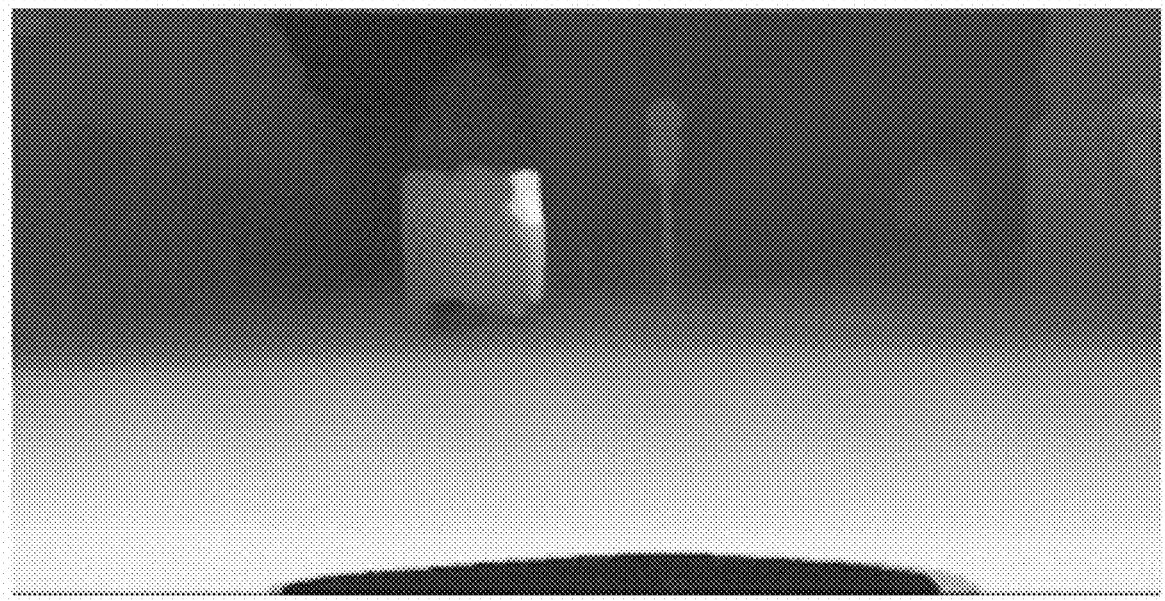
FIG. 3C depicts an example depth image received by an input device of an active learning device when selecting a training image, according to an embodiment of the present disclosure.

The depth decoder 430 may generate a depth image 531 as shown in FIG. 3C based on the output of the encoder 410.

The feature extractor B 432 may extract a third feature 533 from the depth image 531 generated by the depth decoder 430. In an embodiment, the feature extractor B 432 may extract the same feature as the first feature 513 extracted by the encoder 410 as the third feature 533.

Hereinafter, various embodiments of a process for determining the input image 511 as a training image in the controller 40, according to embodiments, are described.

In an embodiment, the controller 40 may sum a first cosine distance 540 between the first feature 513 and the second feature 523 and a second cosine distance 550 between the first feature 513 and the third feature 533 and a third cosine distance 560 between the second feature 523 and the third feature 533 in the feature space, and determine, as a training image, the input image 511 based on a result of the summing. The controller 40 may determine the input image 511 as a training image when a score as shown in Equation 2 below exceeds a threshold value. For reference, when the score does not exceed the threshold value, the training effect of the deep learning model through the input image 511 cannot be expected, so that the input image is not determined as a training image.

$$\text{Score}=L_{ct}\{m_{seg}(\hat{y}_{seg}),m_{depth}(\hat{y}_{depth})\}+L_{ct}\{m_{seg}(\hat{y}_{seg}),f_\varnothing\}+L_{ct}\{m_{depth}(\hat{y}_{depth}),f_\varnothing\} \quad \text{Equation 2}$$

In Equation 2, the first term represents the third cosine distance 560 between the second feature 523 and the third feature 533, and the second term represents the first cosine distance between the first feature 513 and the second feature 523 and represents the second cosine distance 550 between the first feature 513 and the third feature 533.

Figure 6A:
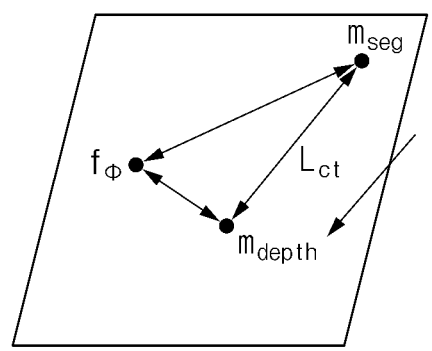
FIG. 6A is a diagram illustrating a case in which an imbalance occurs in the degree of learning between tasks of a deep learning model, according to an embodiment of the present disclosure.
Figure 6B:
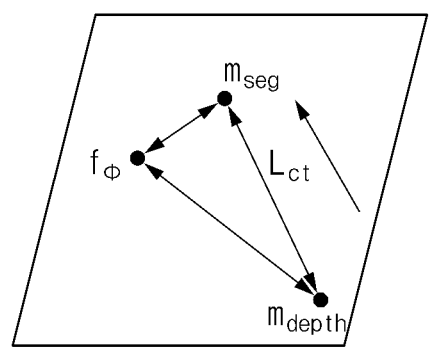
FIG. 6B is a diagram illustrating another case in which an imbalance occurs in the degree of learning between tasks of the deep learning model, according to an embodiment of the present disclosure.

In at least some embodiments, the reason why the first term is included in Equation 2 is to prevent imbalance in the degree of training between tasks (segmentation, depth estimation, and the like) as shown in FIGS. 6A and 6B.

FIG. 6A is a diagram illustrating a case in which an imbalance occurs in the degree of training between tasks of the deep learning model, according to an embodiment.

It can be seen from FIG. 6A that the cosine distance between $f_\varnothing$ and $m_{seg}$ is much longer than the cosine distance between $f_\varnothing$ and $m_{depth}$. Accordingly, it can be seen that the degree of training on depth is much higher than the degree of training on segmentation. This problem may be solved by the first term in Equation 2 above.

FIG. 6B is a diagram illustrating another case in which an imbalance occurs in the degree of training between tasks of the deep learning model, according to an embodiment.

It can be seen from FIG. 6B that the cosine distance between $f_\varnothing$ and $m_{depth}$ is much longer than the cosine distance between $f_\varnothing$ and $m_{seg}$. Accordingly, it can be seen that the degree of training on segmentation is much higher than the degree of training on depth. This problem may be solved by the first term in Equation 2 above.

In another embodiment, the controller 40 may select a specified learning image corresponding to the degree of training for each task of the deep learning model.

When the first cosine distance 540 between the first feature 513 and the second feature 523 does not exceed a threshold value, and the second cosine distance between the first feature 513 and the third feature 533 exceeds the threshold value, the controller 40 may select the input image 511 for use in training a deep learning model having a low degree of training on depth.

When the first cosine distance 540 between the first feature 513 and the second feature 523 exceeds the threshold value, and the second cosine distance between the first feature 513 and the third feature 533 does not exceed the threshold value, the controller 40 may select the input image 511 for use in training a deep learning model having a low degree of training on segmentation.

When the first cosine distance 540 between the first feature 513 and the second feature 523 exceeds the threshold value, and the second cosine distance between the first feature 513 and the third feature 533 exceeds the threshold value, the controller 40 may select the input image 511 for use in training a deep learning model having both a low degree of training on depth and a low degree of training on segmentation.

In an embodiment, the controller 40 may identify the effect of the input image 511 on the deep learning model for each task (segmentation, depth estimation, or the like).

For example, when the first cosine distance 540 between the first feature 513 and the second feature 523 does not exceed a threshold value, and the second cosine distance between the first feature 513 and the third feature 533 exceeds the threshold value, the controller 40 may identify the input image 511 as an image affecting estimation of depth.

As another example, when the first cosine distance 540 between the first feature 513 and the second feature 523 exceeds a threshold value, and the second cosine distance between the first feature 513 and the third feature 533 does not exceed the threshold value, the controller 40 may identify the input image 511 as an image affecting segmentation.

Figure 7:
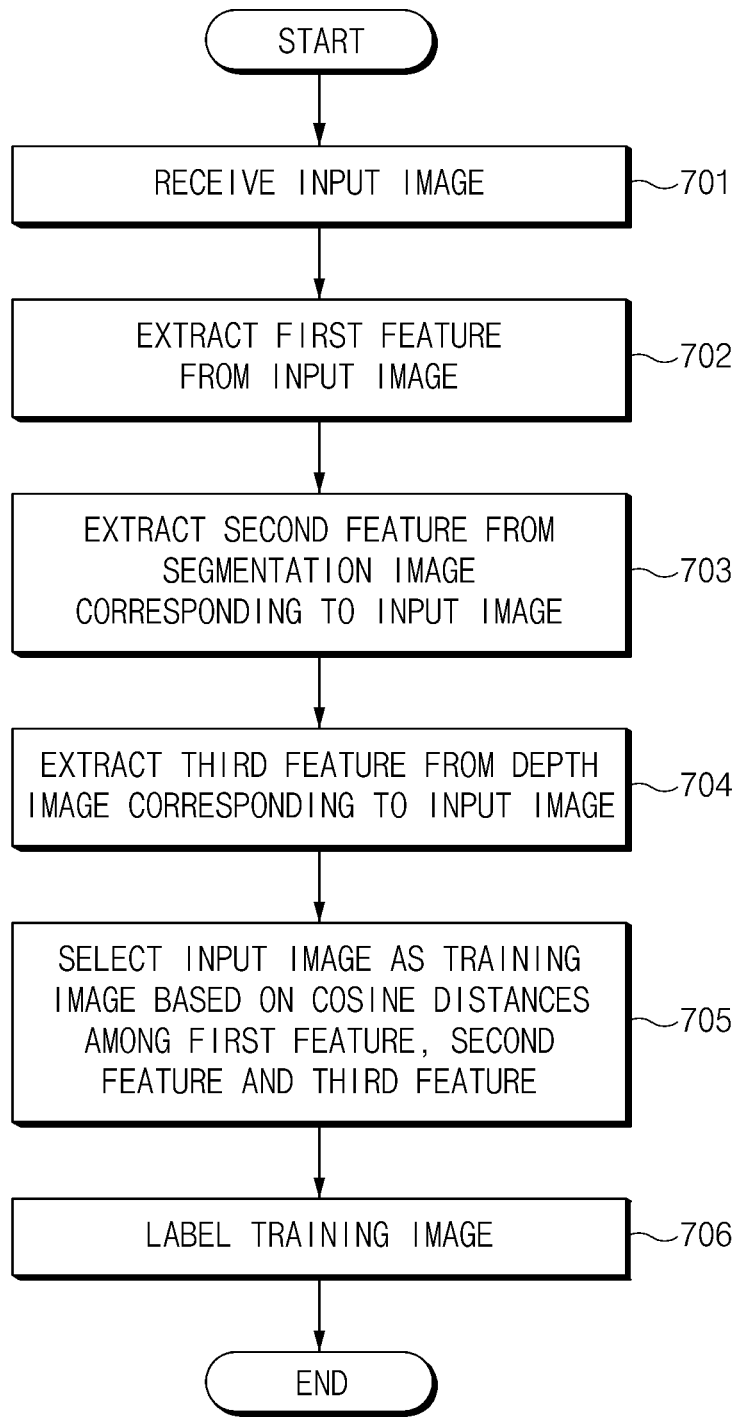
FIG. 7 is a flowchart of an active learning method, according to an embodiment of the present disclosure.

FIG. 7 is a flowchart of an active learning method, according to an embodiment of the present disclosure.

In operation 701, the input device 20 may receive an image.

In operation 702, the controller 40 may extract a first feature from the input image. In an embodiment, the controller 40 may control the encoder 410 for the deep learning model to extract the first feature from the input image.

In operation 703, the controller 40 may extract a second feature from a segmentation image corresponding to the input image. In an embodiment, the controller 40 may control the feature extractor A 422 to extract the second feature from the segmentation image corresponding to the input image.

In operation 704, the controller 40 may extract a third feature from a depth image corresponding to the input image. In an embodiment, the controller 40 may control the feature extractor B 432 to extract the third feature from the depth image corresponding to the input image.

In operation 705, the controller 40 may select the input image as a training image based on cosine distances among the first feature, the second feature, and the third feature.

In operation 706, the controller 40 may label the training image.

Figure 8:
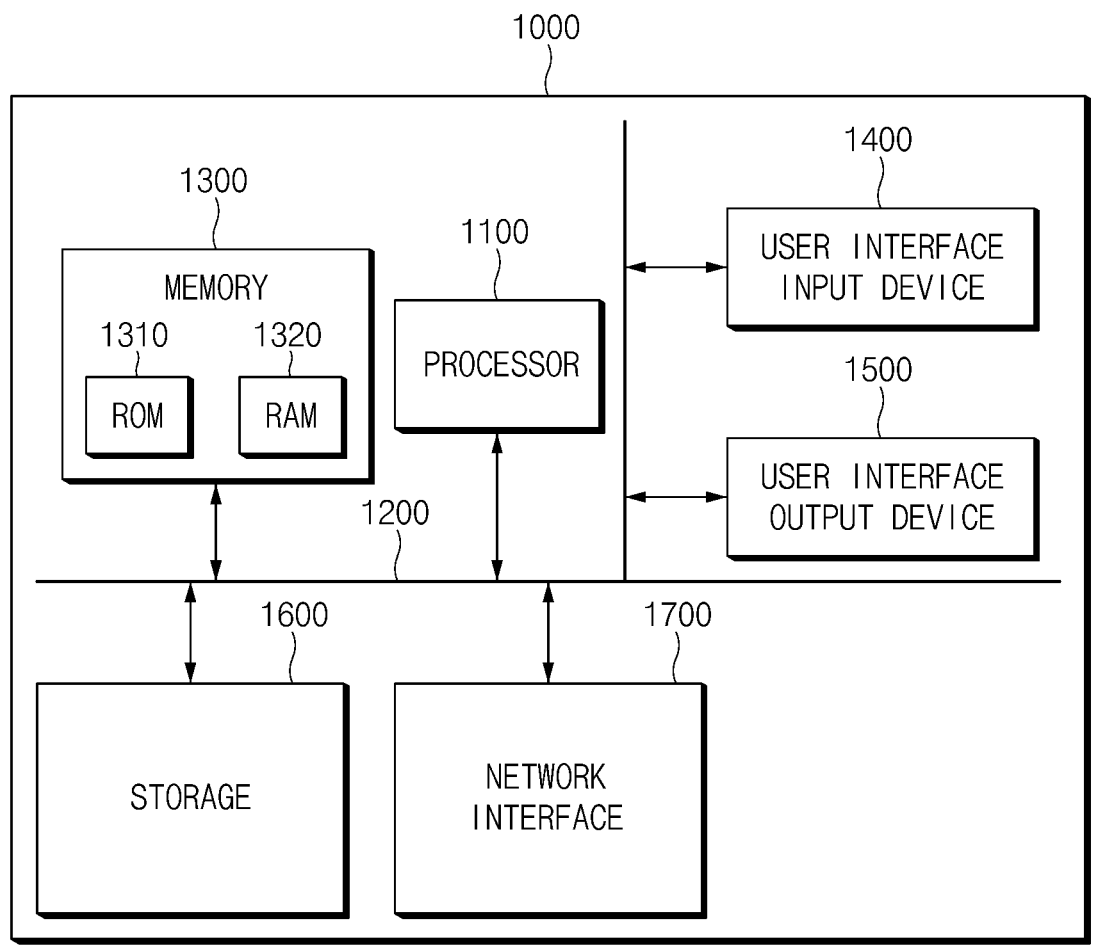
FIG. 8 is a block diagram illustrating a computing system for performing an active learning method, according to an embodiment of the present disclosure.

FIG. 8 is a block diagram illustrating a computing system for performing an active learning method, according to an embodiment of the present disclosure.

Referring to FIG. 8, the active learning method according to the embodiment of the present disclosure as described above may be implemented through a computing system 1000. The computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another embodiment, the processor and the storage medium may reside in the user terminal as separate components.

The above description is merely illustrative of the technical idea of the present disclosure, and various modifications and variations may be made without departing from the essential characteristics of the present disclosure by those having ordinary skill in the art to which the present disclosure pertains.

Accordingly, embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The active learning device and the active learning method according to embodiments of the present disclosure may extract a first feature from an input image, may extract a second feature from a segmentation image corresponding to the input image, and may extract a third feature from a depth image corresponding to the input image. The active learning device and the active learning method may determine the input image as a training image based on cosine distances among the first feature, the second feature and the third feature, and label the training image, thereby labeling a training image capable of improving the performance of the multi-task model.

Hereinabove, although the present disclosure has been provided with reference to example embodiments and the accompanying drawings, the present disclosure is not limited thereto, but may be variously modified and altered by those having ordinary skill in the art to which the present disclosure pertains without departing from the spirit and scope of the present disclosure.

What is claimed is:
1. An active learning device comprising:
an input device configured to receive an input image; and
a controller configured to:
extract a first feature from the input image,
extract a second feature from a segmentation image corresponding to the input image,
extract a third feature from a depth image corresponding to the input image,
determine the input image as a training image based on cosine distances among the first feature, the second feature and the third feature,
label the training image, and
train a deep learning model such that a first cosine distance between the first feature and the second feature and a second cosine distance between the first feature and the third feature are both shortened.

2. The active learning device of claim 1, wherein the controller is configured to:
sum a first cosine distance between the first feature and the second feature, a second cosine distance between the first feature and the third feature, and a third cosine distance between the second feature and the third feature, and
determine the input image as the training image based on a result of the summing.

3. The active learning device of claim 2, wherein the controller is configured to determine the input image as the training image capable of improving performance of a deep learning model when the result of the summing exceeds a first threshold value.

4. The active learning device of claim 2, wherein the third cosine distance induces uniformity in training between tasks of the deep learning model.

5. The active learning device of claim 1, wherein the controller is configured to select a specified training image corresponding to a degree of training for each task of the deep learning model.

6. The active learning device of claim 5, wherein the controller is configured to determine the input image as a training image of a first task corresponding to the third feature, when a first cosine distance between the first feature and the second feature does not exceed a second threshold value and a second cosine distance between the first feature and the third feature exceeds the second threshold value.

7. The active learning device of claim 5, wherein the controller is configured to determine the input image as a training image of a second task corresponding to the second feature when a first cosine distance between the first feature and the second feature exceeds a second threshold value and a second cosine distance between the first feature and the third feature does not exceed the second threshold value.

8. The active learning device of claim 1, wherein the input device is configured to receive a labeled image when training a deep learning model and receive an unlabeled image when selecting a training image of the deep learning model.

9. An active learning method comprising:
receiving, by an input device, an input image;
extracting, by a controller, a first feature from the input image;
extracting, by the controller, a second feature from a segmentation image corresponding to the input image;
extracting, by the controller, a third feature from a depth image corresponding to the input image;
determining, by the controller, the input image as a training image based on cosine distances among the first feature, the second feature, and the third feature;
labeling the training image; and
training, by the controller, a deep learning model such that a first cosine distance between the first feature and the second feature and a second cosine distance between the first feature and the third feature are both shortened.

10. The active learning method of claim 9, wherein determining the input image as the training image includes:
summing, by the controller, a first cosine distance between the first feature and the second feature, a second cosine distance between the first feature and the third feature, and a third cosine distance between the second feature and the third feature; and
determining, by the controller, the input image as the training image based on a result of the summing.

11. The active learning method of claim 10, wherein determining the input image as the training image based on the result of the summing includes determining, by the controller, the input image as the training image capable of improving performance of a deep learning model when the result of the summing exceeds a first threshold value.

12. The active learning method of claim 10, wherein the third cosine distance induces uniformity in training between tasks of the deep learning model.

13. The active learning method of claim 9, wherein determining, by the controller, the input image as the training image includes selecting a specified training image corresponding to a degree of training for each task of the deep learning model.

14. The active learning method of claim 13, wherein selecting the specified training image includes determining, by the controller, the input image as a training image of a first task corresponding to the third feature when a first cosine distance between the first feature and the second feature does not exceed a second threshold value and a second cosine distance between the first feature and the third feature exceeds the second threshold value.

15. The active learning method of claim 13, wherein selecting the specified training image includes determining, by the controller, the input image as a training image of a second task corresponding to the second feature when a first cosine distance between the first feature and the second feature exceeds a second threshold value and a second cosine distance between the first feature and the third feature does not exceed the second threshold value.

16. The active learning method of claim 9, wherein receiving the input image by the input device includes:
receiving a labeled image when training a deep learning model; and
receiving an unlabeled image when selecting the training image of the deep learning model.

* * * * *